(12) United States Patent
Xu (10) Patent No.: US 11,071,283 B2
(45) Date of Patent: Jul. 27, 2021

(54) HARNESS FOR ANIMAL

(71) Applicant: Foshan Aikeli Trading Co., Ltd., Guangdong (CN)

(72) Inventor: Yunfeng Xu, Guangdong (CN)

(73) Assignee: Foshan Aikeli Trading Co., Ltd., Foshan (CN)

( * ) Notice: Subject to any disclaimer, the term of this patent is extended or adjusted under 35 U.S.C. 154(b) by 190 days.

(21) Appl. No.: 16/398,831

(22) Filed: Apr. 30, 2019

(65) Prior Publication Data
US 2020/0015455 A1    Jan. 16, 2020

(30) Foreign Application Priority Data

Jul. 10, 2018 (CN) .......................... 201810752524.4
Jul. 10, 2018 (CN) .......................... 201821091415.4

(51) Int. Cl.
*A01K 27/00* (2006.01)
(52) U.S. Cl.
CPC .......... *A01K 27/002* (2013.01); *A01K 27/001* (2013.01); *A01K 27/003* (2013.01)
(58) Field of Classification Search
CPC .. A01K 27/002; A01K 27/001; A01K 27/005; A01K 27/00
See application file for complete search history.

(56) References Cited

U.S. PATENT DOCUMENTS

| | | | | |
|---|---|---|---|---|
| 7,891,322 B2* | 2/2011 | Bennett | ................ | A01K 27/002 119/856 |
| 8,051,808 B2* | 11/2011 | Mugford | .............. | A01K 27/002 119/792 |
| 9,089,110 B2* | 7/2015 | Lai | ........................ | A01K 27/002 |
| 9,247,716 B2* | 2/2016 | Wilson | ................ | A01K 27/002 |
| 10,130,076 B2* | 11/2018 | Yun | ...................... | A01K 27/002 |
| 2006/0102102 A1* | 5/2006 | Bennett | ................ | A01K 27/005 119/792 |
| 2007/0266960 A1* | 11/2007 | Mugford | .............. | A01K 27/002 119/792 |
| 2015/0164049 A1* | 6/2015 | Lai | ........................ | A01K 27/002 119/792 |
| 2017/0196200 A1* | 7/2017 | Wilson | .................. | A01K 15/02 |

FOREIGN PATENT DOCUMENTS

CN           1886044 A     12/2006

\* cited by examiner

*Primary Examiner* — Kristen C Hayes (57) ABSTRACT

A harness for an animal, including a chest strap, an abdominal strap and a back strap; the chest strap is provided with a tightening member, the tightening member comprising a buckle, a tightening strap and a lead ring. The tightening strap passes through the buckle, two ends of the tightening strap are respectively connected to two sides of the chest strap, and the lead ring is connected to a middle of the tightening strap. The harness of the present invention can be effectively used to restrain an animal from rushing and relief the animal from excessive stress, and also to prevent an owner from being dragged by the animal.

10 Claims, 7 Drawing Sheets

HARNESS FOR ANIMAL

CROSS REFERENCE TO RELATED APPLICATIONS

The present application claim the priority of Chinese Patent Application No. 201810752524.4 filed on Jul. 10, 2018 and Chinese Utility Model Application No. 201821091415.4 filed on Jul. 10, 2018, the contents of which are hereby incorporated by reference.

FIELD OF THE INVENTION

The present invention relates to the field of harnesses and particularly to a harness for an animal.

BACKGROUND OF THE INVENTION

Generally, an existing pet collar is usually tied directly to a pet's neck and a leash is connected to the pet collar. Despite being simple and effective in restraining pets, this approach may cause discomfort to the pet when it is pulling the leash in a reverse direction; this is particularly the case when the pet suddenly becomes aggressive (e.g., during an outburst of the animal). Consequently, the pet collar exerts a strong impact force on the pet and possibly inflicts damages to particularly the neck of the pet. In another aspect, in case of an outburst of a large or medium-sized dog which is capable of exerting a pulling force comparable to that applied by human, the lines of action of the pulling forces applied by the owner (i.e., a human controlling the animal from behind) and the animal on leash will be on a straight line if the leash is tied at the rear of the neck or the back of the animal. This may easily provoke an instinctual consciousness of the animal for rushing forward, which eventually results in either the dragging of the owner or the animal may be severely injured due to the stress exerted by the collar. Although to some extent, the animal can be guided to turn to a different direction if the leash is tied at the front of the animal's neck, the existing collar or the lead ring of the collar may slide in this case.

According to the animal harness disclosed in Chinese patent publication No. CN 1886044A, a lead ring is arranged at the front of a collar; however, the lead ring could slide on the chest strap. Such an arrangement may cause the lead ring to slide towards the back of the animal along the chest strap when the animal is aggressive. Furthermore, although the arrangement allows the formation of an angle between the lines of action of the pulling forces exerted by the animal and the owner to some extent, such an angle is ineffective to prevent the animal from lunging; in addition, the actual point of application of the pulling force exerted by the owner is not at the front of the front chest of the animal, but is shifted backwards instead. Therefore, when the animal is aggressive, the impact force generated by the animal cannot be effectively utilized to alter the direction of the animal's movement; in addition, the impact force experienced by the animal cannot be reduced by cushioning. As a result, the animal on leash is injured by the instantaneous impact force or the owner is dragged by the animal.

The above invention provides another embodiment in which a cinch ring is connected to the collar via a stabilizing link to further restrain the sliding of the lead ring on the chest strap. However, in practice, the collar, which is connected to the stabilizing link, is rotatable; therefore, when the lead ring is subjected to external force, the collar is rotated, or the components attached to the collar slide towards the back of the animal; as a result, the lead ring also slides in the same direction.

SUMMARY OF THE INVENTION

It is an objective of the present invention to provide a harness for an animal, which has a simple structure and can effectively reduce the impact force exerted by an aggressive animal; the harness of the present invention can also reduce the damage to the animal as a result of the powerful impact force exerted by the harness.

In order to achieve the above objective, the present invention provides a harness for an animal, comprising a chest strap, an abdominal strap, and a back strap, the chest strap is provided with a tightening member, the tightening member comprises a buckle, a tightening strap, and a lead ring; wherein the buckle is fixed to a middle of the chest strap, the tightening strap passes through the buckle, two ends of the tightening strap are respectively connected to two sides of the chest strap; the tightening strap and the chest strap are connected at a first junction and a second junction, a length of the tightening strap is greater than a distance between the first junction and the second junction; the lead ring is connected to a middle of the tightening strap; when the lead ring is being pulled, the tightening strap is first tightened, the first junction and the second junction of the chest strap are then pulled to tighten the chest strap.

As a modification of the above technical solution, the length of the tightening strap is 150 to 200% of the distance between the first junction and the second junction.

As a modification of the above technical solutions, the tightening strap is in contact with the buckle at a first contact portion and a second contact portion; the buckle is fixed to the chest strap via a chest strap fixing portion, an angle between a line connecting the first contact portion and the second contact portion and a line connecting the first contact portion and the chest strap fixing portion is from 0 to 60°.

As a modification of the above technical solutions, a ratio of a distance between the first junction and the chest strap fixing portion to a length of the chest strap is from 1:8 to 1:6.

As a modification of the above technical solutions, the first contact portion and the second contact portion of the buckle are each provided with a rolling member to decrease friction between the buckle and the tightening strap.

As a modification of the above technical solutions, the rolling member is an eccentric roller.

As a modification of the above technical solutions, the buckle is B-shaped, T-shaped, or V-shaped.

As a modification of the above technical solutions, the back strap comprises a protector pad which is shaped to adapt to a contour of a back of the animal, the chest strap and the abdominal strap are each provided with a chest protector pad, the chest protector pads of the chest strap and the abdominal strap are connected to each other to cover a front chest of the animal; a neck strap is provided between the back strap and the chest strap, the neck strap is connected to the chest strap and the back strap respectively to restrain a neck of the animal; two ends of the back strap are connected to the chest strap to restrain the front chest of the animal, and two ends of the abdominal strap are connected to the back strap to restrain a torso of the animal.

As a modification of the above technical solutions, two ends of the abdominal strap are each provided with a removable soft rubber member; the back strap and the chest protector pad are each provided with soft protrusions arranged in a dot-matrix.

As a modification of the above technical solutions, at least one of the chest strap, the back strap, the neck strap, and the abdominal strap is provided with a connecting buckle so that when using the harness, junctions connecting the chest strap and the abdominal strap are disposed above roots of forelegs of the animal.

From the above, the present invention has the following advantages:

The present invention provides a harness for an animal, comprising a chest strap, an abdominal strap, and a back strap, the chest strap is provided with a tightening member, the tightening member comprises a buckle, a tightening strap, and a lead ring; the buckle is fixed to a middle of the chest strap, the tightening strap passes through the buckle, and two ends of the tightening strap are respectively connected to two sides of the chest strap; the tightening strap and the chest strap are connected at a first junction and a second junction, a length of the tightening strap is greater than a distance between the first junction and the second junction; the lead ring is first tightened, the first junction and the second junction of the chest strap are then pulled to tighten the chest strap.

Therefore, when the animal wearing the harness of the present invention becomes aggressive, the lead ring causes the tightening strap to be tightened first. When the length of the tightening strap is reduced to the distance between the first and the second junctions of the chest strap by tightening, the tightening strap pulls the first and second junctions so that the chest strap is tightened. Ultimately, the impact force experienced by the restrained animal can be effectively reduced. As a result, the damages inflicted on the animal from the harness caused by the powerful impact force are reduced. In addition, the restraining force applied to the front chest of the animal by the tightening of the chest strap can further restrain the animal.

The buckle is fixed to the middle of the chest strap. Therefore, the buckle maintains its position regardless of external forces applied. As a result, the force of action of the pulling force exerted by the leash on the animal remains unchanged.

Since the buckle is fixed to the middle of the chest strap, the force generated by the lunging animal can be utilized to force the left/right turning of the animal. In this way, the animal can be restrained from rushing forward preventing the owner from being dragged by the animal.

DRAWINGS OF THE INVENTION

LIST OF REFERENCE NUMERALS 1. chest strap;
11. first junction;
12. second junction;
13. chest strap fixing portion;
2. tightening strap;
3. buckle;
31. rolling member;
32. first contact portion;
33. second contact portion;
4. lead ring;
5. abdominal strap;
6. back strap;
61. soft protrusions;
62. hook-and-loop fastener;
63. large protector pad;
64. lifting strap;
7. connecting buckle;
8. chest protector pad;
81. Hook-and-loop fastener;
9. removable soft rubber member.

DETAILED DESCRIPTION OF ILLUSTRATED EMBODIMENTS

To better illustrate the objective, technical solution, and advantages of the present invention, the present invention will be further described in the detailed description in combination with the accompanying drawings and the embodiments.

Figure 1:
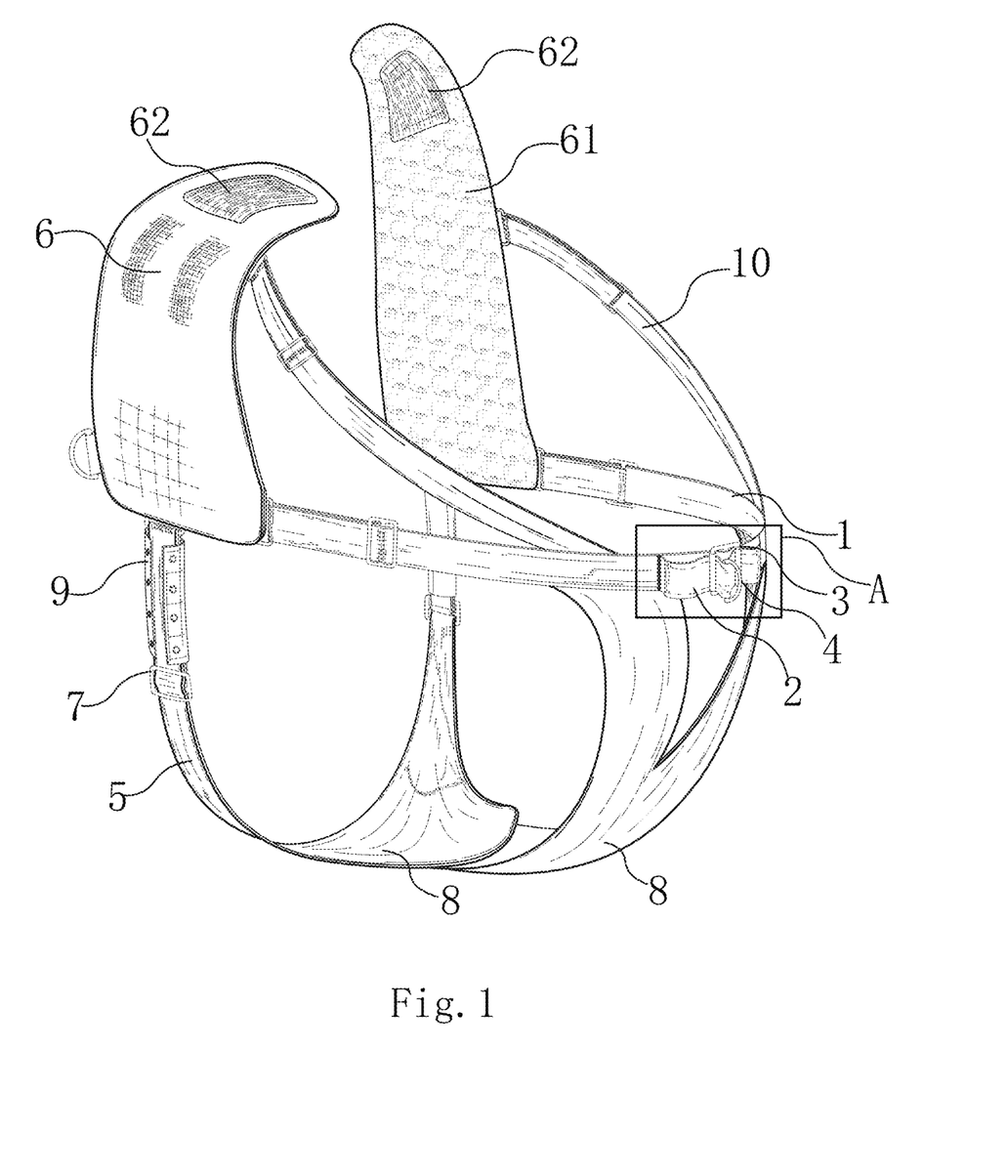
FIG. 1 is a schematic perspective view of a first embodiment of the present invention.

As shown in FIG. 1, the first embodiment of the present invention provides a harness for an animal, which comprises a chest strap 1, an abdominal strap 5, a back strap 6, and a neck strap 10; the chest strap 1 is provided with a tightening member, the tightening member includes a buckle 3, a tightening strap 2, and a lead ring 4. Two ends of the back strap 6 are connected to the chest strap 1 to restrain the front chest of the animal. Two ends of the abdominal strap 5 are connected to the back strap 6 to restrain the torso of the animal. The neck strap 10 is connected to the chest strap 1 and the back strap 6 respectively to restrain the neck of the animal.

Figure 2:
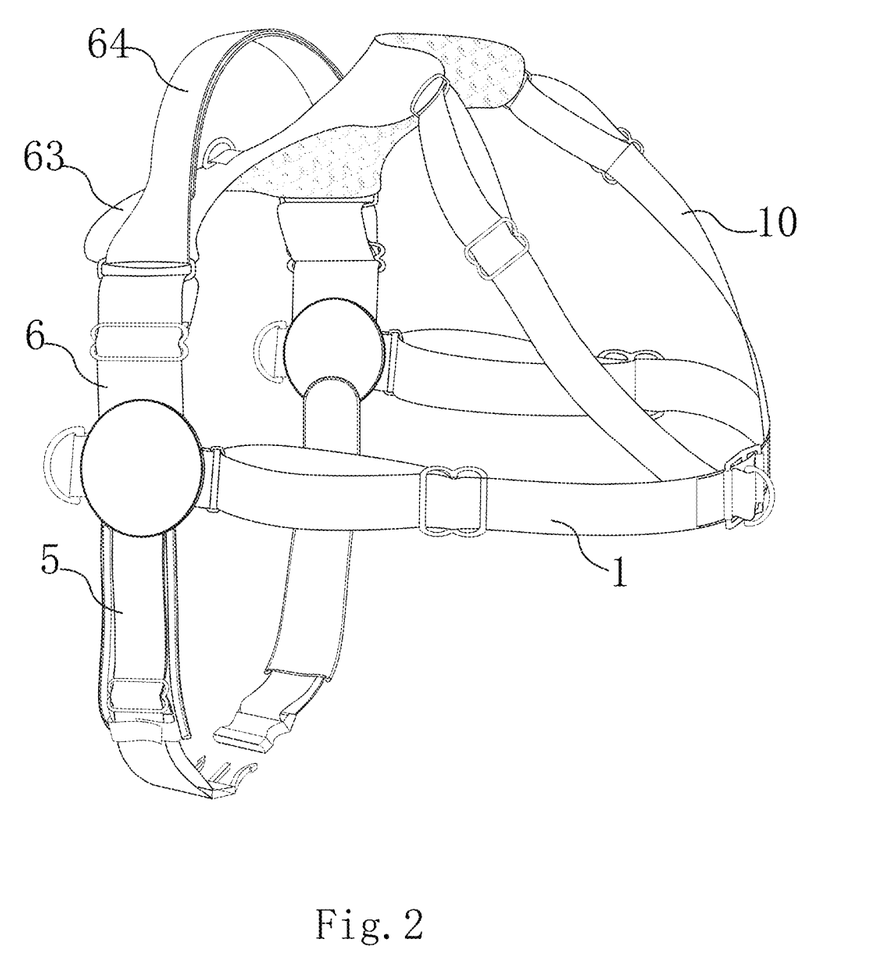
FIG. 2 is a schematic view showing another structure of the back strap in the first embodiment of the present invention.

Specifically, in order to improve the wellbeing of the animal when it is wearing the harness of the present invention, the back strap 6 includes two protector pads (not shown in the drawings) which are shaped to adapt to the contour of the back of the animal. The two protector pads are preferably connected via a hook-and-loop fastener 62, or optionally via a connecting buckle, a snap buckle, and the like. In addition, as shown in FIG. 2, the back strap 6 could also include only one protector pad, the protector pad is a large protector pad 63 which directly conforms to the contour of the back of the restrained animal. Also, a lifting strap 64 for lifting is arranged above the large protector pad 63, two ends of the lifting strap 64 are connected to the back strap 6 at two sides.

Further, as shown in FIGS. 1, 3, 4 and 5, the chest strap 1 and the abdominal strap 5 are each provided with a chest protector pad 8; the chest protector pad 8 of the chest strap 1 and the chest protector pad 8 the abdominal strap 5 are connected to each other to cover the front chest of the animal. In addition, the protector pads, the chest protector pads 8 and the neck strap 10 are arranged in such a manner that the chest strap 1 is effectively prevented from rotating or shifting. Preferably, the chest protector pad 8 of the chest strap 1 and the chest protector pad 8 of the abdominal strap 5 are connected to each other via a hook-and-loop fastener 81.

On the other hand, the restrained animal may suffer from discomfort and poor heat dissipation due to the large area covered by the harness of the present invention. Therefore, the back strap 6 and the chest protector pad 8 are each provided with soft protrusions 61 arranged in a dot-matrix to reduce the contact area between the harness of the present invention and the restrained animal, to improve air fluidity therebetween, and to massage the animal at the same time.

The roots (i.e., upper ends) of the forelegs of the restrained animal are in constant contact with the harness of the present invention due to the frequent movement of the forelegs. Therefore, in order to avoid constant friction between the roots of the forelegs and the junctions of the chest strap 1 and the abdominal strap 5, at least one of the chest strap 1, the back strap 6, the neck strap 10 and the abdominal strap 5 is provided with a connecting buckle 7 for length adjustment to allow the junctions of the chest strap 1 and the abdominal strap 5 to be disposed above the roots of the forelegs of the restrained animal.

In addition, the harness of the present invention can be worn by animals of various body shapes and sizes by adjusting the lengths of the chest strap 1, the back strap 6, the neck strap 10 and the abdominal strap 5. Preferably, the chest strap 1, the back strap 6, the neck strap 10 and the abdominal strap 5 are each provided with two connecting buckles 7.

In order to further reduce the damage to the skin of the underarm parts near the animal's forelegs caused by the harness of the present invention, two ends of the abdominal strap 5 are each provided with a removable soft rubber member 9 to massage the skin of the underarm parts and to alleviate frictional damages to the skin.

As a first innovative aspect of the present invention, the tightening strap 2 is tightened first when the restrained animal is becoming aggressive; this is followed by the tightening of the chest strap 1. In this way, the impact force experienced by the restrained animal can be effectively reduced; in addition, the damage to the animal caused by the harness due to strong impact forces can be reduced. Furthermore, the pressure acting on the front chest of the animal exerted by the tightening of the chest strap 1 can further discourage the aggressive behavior of the animal.

Figure 3:
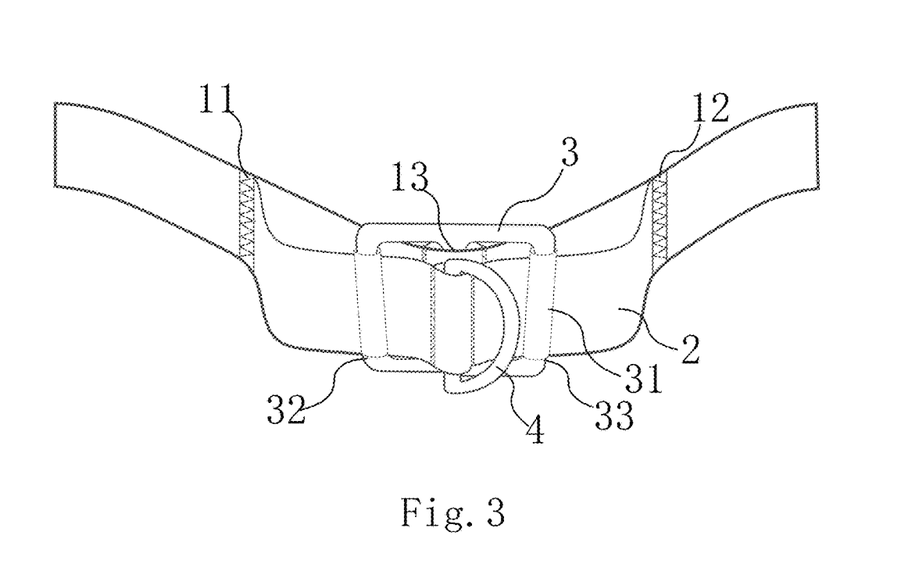
FIG. 3 is a partial enlarged view of region A of FIG. 1.
Figure 4:
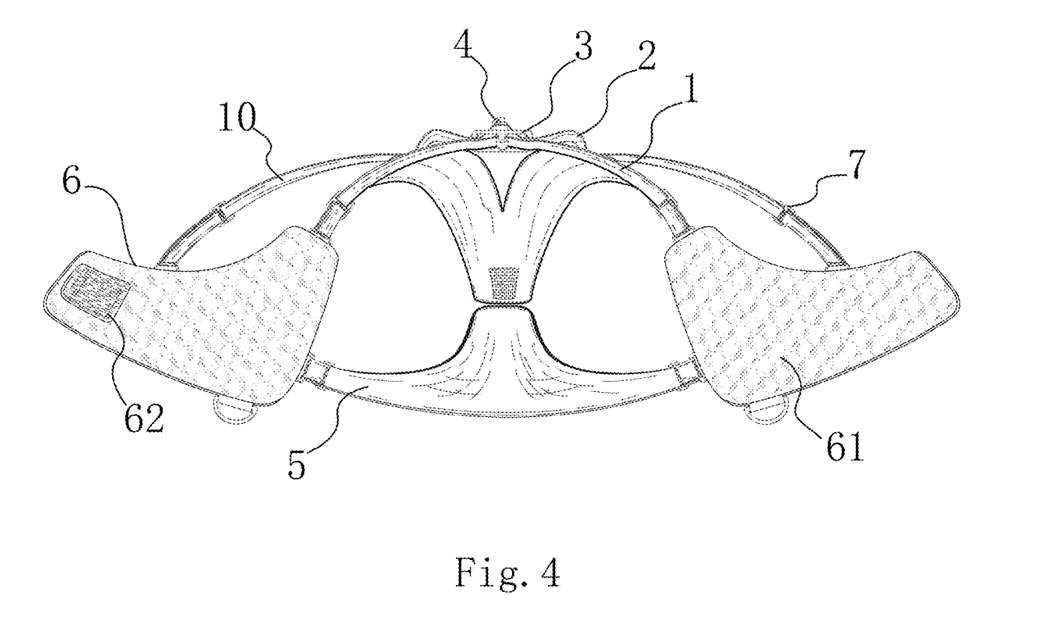
FIG. 4 is a schematic structural view of FIG. 1 from another angle.
Figure 5:
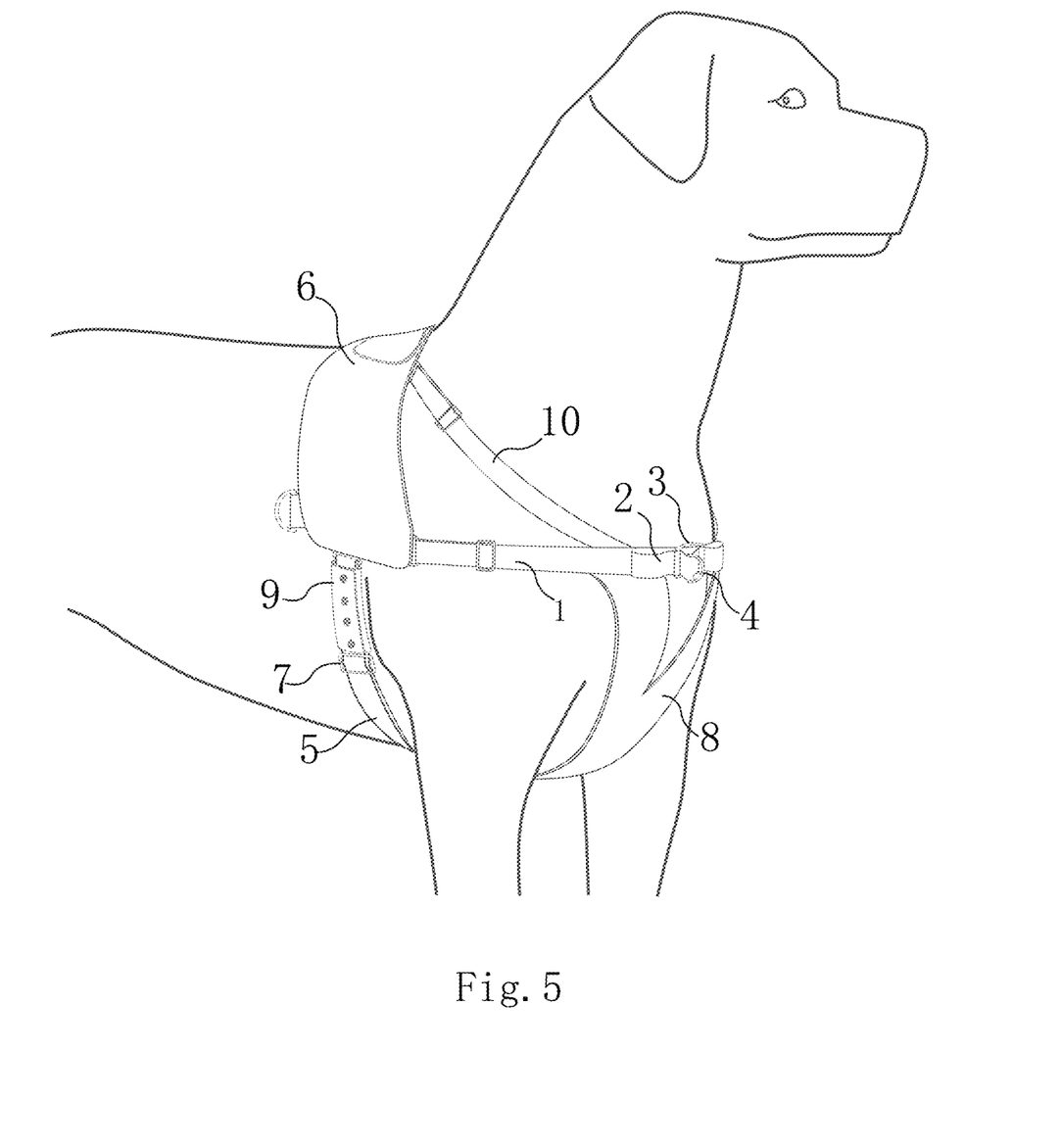
FIG. 5 is a schematic view showing the first embodiment of the present invention when it is in use.

In order to achieve the above function, the buckle 3 is fixed to the middle of the chest strap 1; the tightening strap 2 passes through the buckle 3, and two ends of the tightening strap 2 are respectively connected to two sides of the chest strap 1. The tightening strap 2 and the chest strap 1 are connected at a first junction 11 and a second junction 12. The length of the tightening strap 2 is greater than the distance between the first junction 11 and the second junction 12.

Preferably, the length of the tightening strap 2 is 150% to 200% of the distance between the first junction 11 and the second junction 12. The ratio of the distance between the first junction 11 and a chest strap fixing portion 13 to the length of the chest strap 1 is from 1:8 to 1:6.

The tightening strap 2 is in contact with the buckle 3 at a first contact portion 32 and a second contact portion 33; the buckle 3 is fixed to the chest strap 1 via the chest strap fixing portion 13. The lead ring 4 is connected to the middle of the tightening strap 2. When being pulled, the lead ring 4 causes the tightening strap 2 to tighten first; when the length of the tightening strap 2 is reduced to the distance between the first junction 11 and the second junction 12 of the chest strap 1, the first junction 11 and the second junction 12 are being pulled so that the chest strap 1 is tightened. Preferably, the tightening strap 2 is an elastic strap. Preferably, the buckle 3 is B-shaped, T-shaped, V-shaped or the like, but is not limited thereto.

Therefore, when the animal wearing the harness of the present invention suddenly lunges forward, the tightening of the tightening strap 2 effectively allows the chest strap 1 to exert a cushioning effect on the animal's front chest in a way that is similar to an elastic strap.

It should be noted that the bigger the difference between the length of the tightening strap 2 and the distance between the first junction 11 and the second junction 12, the longer the cushioning process of the tightening strap 2, that is, a greater cushioning effect is provided. In addition, the length of the tightening strap 2 is affected by the ratio of the distance between the first junction 11 and the chest strap fixing portion 13 to the length of the chest strap 1, further affecting the length of the chest strap 1.

To allow the harness of the present invention to be fitted to animals of various body shapes and sizes, the difference between the length of the tightening strap 2 and the distance between the first junction 11 and the second junction 12 needs to be limited. The ratio of the distance between the first junction 11 and the chest strap fixing portion 13 to the length of the chest strap 1 also needs to be limited. These limitations aim to prevent the impact force exerted by the animal from exceeding the cushioning ability of the tightening strap 2 when the animal is aggressive.

When the length of the tightening strap 2 is shorter than 150% of the distance between the first junction 11 and the second junction 12, the cushioning process of the tightening strap is too short, which leads to a decreased cushioning effect; the animal may be injured due to the lack of cushioning when it is aggressive. When the length of the tightening strap 2 is longer than 200% of the distance between the first junction 11 and the second junction 12, although the tightening strap is able to provide sufficient cushioning, the cushioning process becomes too long. In this case, the action of the tangential force, which forces the left/right turning of the animal, is delayed. When the animal on leash is lunging forwards, its direction of movement cannot be immediately altered as a result of the delayed action of tangential force, which may lead to the dragging of the owner by the animal.

The first contact portion 32 and the second contact portion 33 of the buckle 3 are each provided with a rolling member 31 to decrease the friction between the buckle 3 and the tightening strap 2. Preferably, the rolling member 31 is an eccentric roller.

It should be noted that the eccentric roller rolls under the effect of friction as the tightening strap 2 is tightening. The friction between the eccentric roller and the tightening strap 2 changes periodically as the former rolls. This gives rise to a plurality of cushioning stages during the tightening of the tightening strap 2.

Further, in order to better control the friction between the buckle 3 and the tightening strap 2, the angle between a line connecting the first contact portion 32 and the second contact portion 33 and a line connecting the first contact portion 32 and the chest strap fixing portion 13 is from 0 to 60°. The friction between the buckle 3 and the tightening strap 2 increases as the aforementioned angle decreases. Preferably, the angle is 30°.

As a second innovative aspect of the present invention, the point of action of the pulling force on the animal does not shift when the animal wearing the harness of the present invention lunges forward. The impact force experienced by the animal can be utilized to restrain the lunging of the animal. The aggressive animal on leash can be easily controlled, preventing the dragging of the owner by the animal.

The buckle 3 allows the pulling force exerted by the owner to be concentrated at the position of the buckle 3. As the buckle 3 is fixed to the middle of the chest strap 1, the point of action of the pulling force is kept at the middle of the front chest of the animal.

It should be noted that when the point of action is at the middle of the animal's front chest, the overall effect of the force exerted by the owner walking behind the animal and the force exerted by the lunging animal is a tangential force, which forces the animal to turn left or right. When the force of action is at the front chest of the animal, it is the optimal point of action: the turning of the animal can be most easily achieved.

In contrast, as disclosed in the Chinese patent publication No. CN1886044A, although a stabilizing link is provided to restrain a component equivalent to the buckle 3 of the present invention, the component equivalent to the buckle 3 of the present invention may still slide towards the back of the animal (i.e., the point of action of the pulling force moves towards the back of the animal) when the animal rushes forward. This is because the collar connected to the fixed connecting member is rotatable. As the point of action of the pulling force moves closer to the foreleg of the animal, the ability of the pulling force to alter the direction of movement of the animal is decreased. In addition, the lines of action of the pulling forces exerted by the lunging animal and the owner are almost on the same line. Eventually, the impact force experienced by the animal cannot be effectively utilized to restrain the animal from lunging, which may result in the dragging of the owner by the animal.

Figure 6:
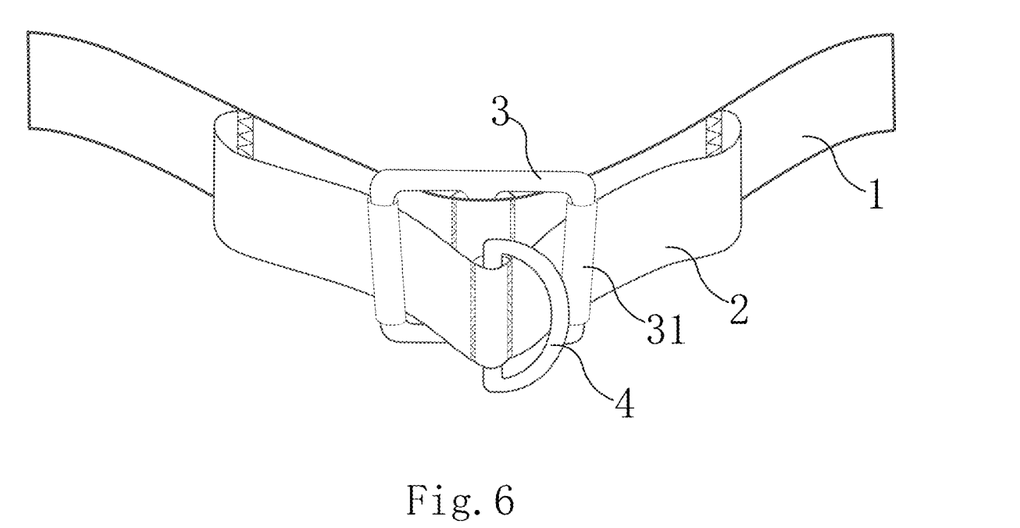
FIG. 6 is a schematic view showing the connection between a tightening strap and a chest strap in the second embodiment of the present invention.

FIG. 6 shows the second embodiment of the present invention. The difference between the second and the first embodiment is that in the second embodiment, the front side of the tightening strap 2 and the chest strap 1 are stitched together at the two ends of the tightening strap 2, whereas in embodiment 1, the back side of the tightening strap 2 and the chest strap 1 are stitched together at the two ends of the tightening strap 2. During the tightening of the tightening strap 2, the thickness at the seams (i.e., the first junction and the second junction) of embodiment 2 is greater than that of embodiment 1 by the thickness of one strap. Therefore, the resistance increases instantaneously when the seams are passing through the buckle 3 as the tightening strap 2 tightens. After the seams have completely passed through the buckle 3, the chest strap 1 (which is not as thick) follows, hence resistance is reduced.

When the animal is becoming overly aggressive, the design described above can offset a part of the impact force before the chest strap 1 is overly tightened. When the impact force exerted by the animal is sufficient to allow the seams to pass through the buckle, it indicates that the impact force exerted by the animal may be too big for the owner to control. In order to stop the aggressive behavior of the animal, the tightening of the tightening strap 2 needs to be accelerated to exert a large pressure on the front chest of the animal.

Figure 7:
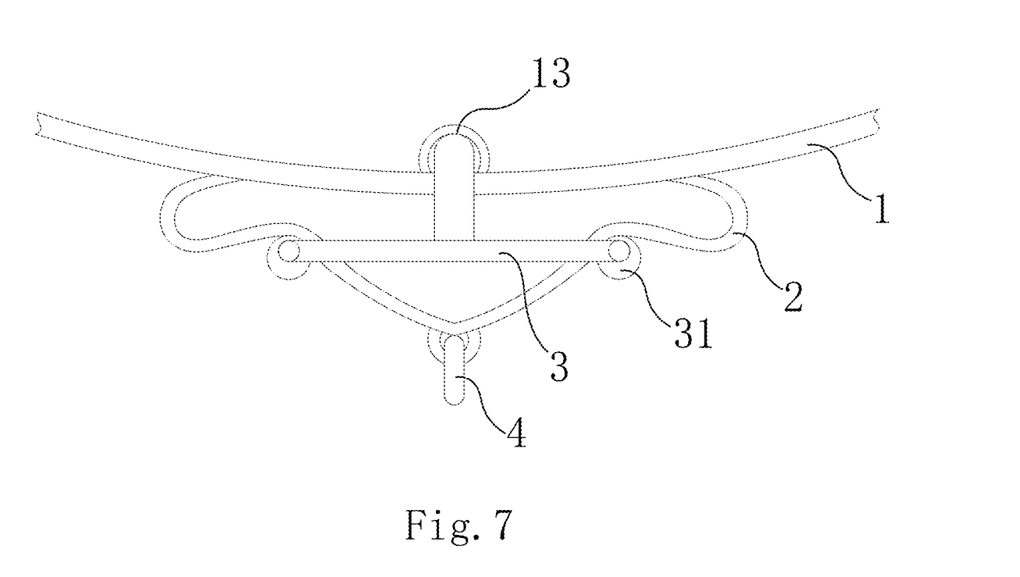
FIG. 7 is a schematic view showing the connection between a tightening strap and a chest strap in the third embodiment of the present invention.
Figure 8:
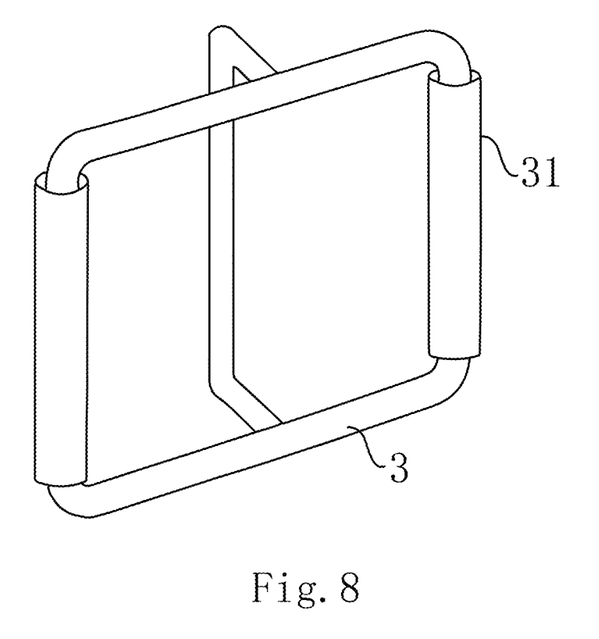
FIG. 8 is a schematic view showing the structure of the buckle according to the third embodiment of the present invention.

FIGS. 7 and 8 illustrate the third embodiment of the present invention. The difference between the third embodiment and the first embodiment is that the buckle 3 is T-shaped. Other components are the same and therefore will not be described again.

Figure 9:
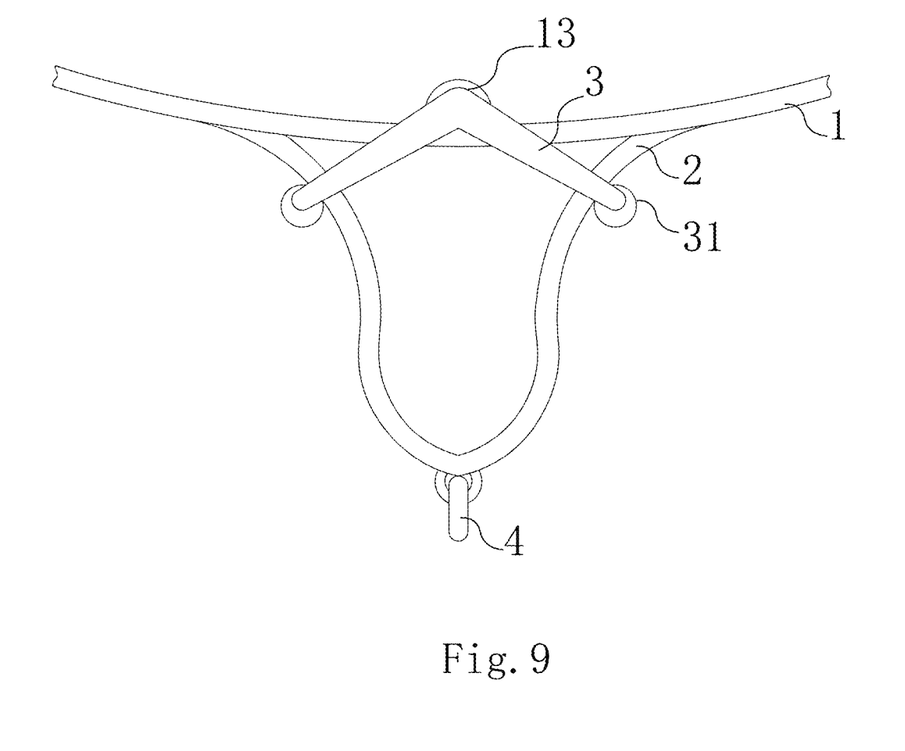
FIG. 9 is a schematic view of a connection structure of a buckle in a fourth embodiment of the present invention.
Figure 10:
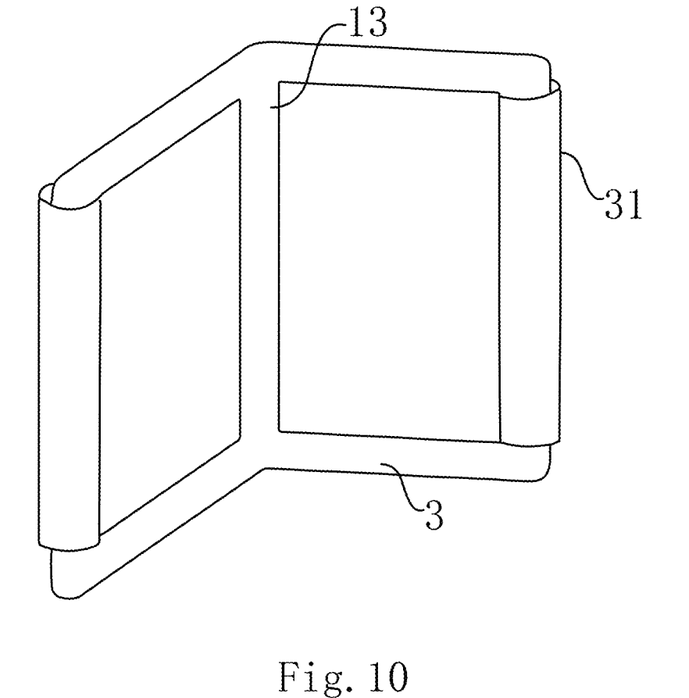
FIG. 10 is a schematic view showing the structure of the buckle in the fourth embodiment of the present invention.

Similarly, FIGS. 9-10 illustrate the fourth embodiment of the present invention. The difference between the fourth embodiment and the first embodiment is that the buckle 3 is V-shaped. Other components are the same and therefore will not be described again.

The embodiments disclosed above are the preferred embodiments of the present invention. It should be noted that for those skilled in the art, improvements and modifications can be made without departing from the principle of the invention, these improvements and modifications should also be considered as within the scope of the invention.

The invention claimed is:

1. A harness for an animal, comprising a chest strap, an abdominal strap, and a back strap, the chest strap is provided with a tightening member, the tightening member comprises a buckle, a tightening strap, and a lead ring;
   wherein the buckle is fixed to a middle of the chest strap, the tightening strap passes through the buckle, two ends of the tightening strap are respectively connected to two sides of the chest strap; the tightening strap and the chest strap are connected at a first junction and a second junction, a length of the tightening strap is greater than a distance between the first junction and the second junction;
   the lead ring is connected to a middle of the tightening strap; when the lead ring is being pulled, the tightening strap is first tightened, the first junction and the second junction of the chest strap are then pulled to tighten the chest strap.

2. The harness of claim 1, wherein the length of the tightening strap is 150 to 200% of the distance between the first junction and the second junction.

3. The harness of claim 1, wherein the tightening strap is in contact with the buckle at a first contact portion and a second contact portion; the buckle is fixed to the chest strap via a chest strap fixing portion, an angle between a line connecting the first contact portion and the second contact portion and a line connecting the first contact portion and the chest strap fixing portion is from 0 to 60°.

4. The harness of claim 3, wherein a ratio of distance between the first junction and the chest strap fixing portion to a length of the chest strap is from 1:8 to 1:6.

5. The harness of claim 3, wherein the first contact portion and the second contact portion of the buckle are each provided with a rolling member to decrease friction between the buckle and the tightening strap.

6. The harness of claim 5, wherein the rolling member is an eccentric roller.

7. The harness of claim 1, wherein the buckle is B-shaped, T-shaped, or V-shaped.

8. The harness of claim 1, wherein the back strap comprises a protector pad which is shaped to adapt to a contour of a back of the animal, the chest strap and the abdominal strap are each provided with a chest protector pad, the chest protector pads of the chest strap and the abdominal strap are connected to each other to cover a front chest of the animal; and
   a neck strap is provided between the back strap and the chest strap, the neck strap is connected to the chest strap and the back strap respectively to restrain a neck of the animal; two ends of the back strap are connected to the chest strap to restrain the front chest of the animal, and two ends of the abdominal strap are connected to the back strap to restrain a torso of the animal.

9. The harness of claim 1, wherein two ends of the abdominal strap are each provided with a removable soft rubber member; the back strap and the chest protector pad are each provided with soft protrusions arranged in a dot-matrix.

10. The harness of claim 8, wherein at least one of the chest strap, the back strap, the neck strap, and the abdominal strap is provided with a connecting buckle so that when using the harness, junctions connecting the chest strap and the abdominal strap are disposed above roots of forelegs of the animal.

* * * * *